(12) United States Patent
Jung

(10) Patent No.: US 9,492,752 B2
(45) Date of Patent: Nov. 15, 2016

(54) METHOD AND DEVICE FOR PROVIDING CHARACTER OF ONLINE GAME

(71) Applicant: Intellectual Discovery Co., Ltd., Seoul (KR)

(72) Inventor: Hyun Cho Jung, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 74 days.

(21) Appl. No.: 14/363,979

(22) PCT Filed: Nov. 22, 2012

(86) PCT No.: PCT/KR2012/009920
§ 371 (c)(1),
(2) Date: Jun. 9, 2014

(87) PCT Pub. No.: WO2013/085183
PCT Pub. Date: Jun. 13, 2013

(65) Prior Publication Data
US 2014/0357381 A1 Dec. 4, 2014

(30) Foreign Application Priority Data

Dec. 9, 2011 (KR) ........................ 10-2011-0132304

(51) Int. Cl.
*A63F 13/69* (2014.01)
*G06Q 50/10* (2012.01)
*A63F 13/79* (2014.01)

(52) U.S. Cl.
CPC ............... *A63F 13/69* (2014.09); *A63F 13/79* (2014.09); *G06Q 50/10* (2013.01)

(58) Field of Classification Search
CPC ........... A63F 13/10; A63F 13/12; A63F 13/69
See application file for complete search history.

(56) References Cited

U.S. PATENT DOCUMENTS

| 2007/0123327 A1* | 5/2007 | Van Luchene | A63F 13/12 463/1 |
| 2009/0011835 A1* | 1/2009 | Hansen | A63F 13/12 463/42 |

(Continued)

FOREIGN PATENT DOCUMENTS

| JP | 2007-229205 A | 9/2007 |
| KR | 10-0455865 B1 | 11/2004 |

(Continued)

OTHER PUBLICATIONS http://www.xconomy.com/boston/2010/02/01/at-quick-hit-players-can-now-draft-nfl-legends-for-virtual-currency/#, Xconomy, "At Quick Hit, Players Can Now Draft NFL Legends for Virtual Currency" by Wade Roush dated Feb. 1, 2010.*

(Continued)

*Primary Examiner* — James S McClellan
*Assistant Examiner* — Kevin Carter
(74) *Attorney, Agent, or Firm* — Sughrue Mion, PLLC

(57) ABSTRACT

In an online game for providing special characters, a skill for providing special characters having capability points that cannot be generally acquired in the game and allowing the user to acquire the special characters according to a predetermined probability to increase scarcity values of the special characters, and increasing other users' interests in the user owning the special characters to increase a positive image on the game by the users and also increase interest in the game, is provided. A method for providing a character of an online game includes: by a character providing device, receiving a using signal on a special character item that is one of items owned by a user from a user terminal; when receiving the using signal, setting at least one special character that is a character generated according to a predetermined standard and at least one other character excluding the special character as characters that may be won; setting (Continued)

| Character information | | | |
|---|---|---|---|
| CN — Character name | | | |
| CI — Character image | Common | 98/100 | — SK1 |
| | Attack | 97/100 | — SK2 |
| | Pass | 98/100 | — SK3 |
| | Defense | 99/100 | — SK4 |
| | Goalkeeping | 100/100 | — SK5 |
| TSP — Total skill points | 492/500 | | |
| ST — Experience points | 0 | | |
| CP — Capability points | 492 | | | a probability for the user to acquire one of the at least one special character; casting lots according to the predetermined probability, and determining one character, from among one of the at least one special character that is set to be a character that may be won and the at least one other character, as a won character; and registering the won character to a database of characters owned by the user.

12 Claims, 9 Drawing Sheets

(56) References Cited

U.S. PATENT DOCUMENTS

| | | | | |
|---|---|---|---|---|
| 2009/0149248 | A1* | 6/2009 | Busey | A63F 13/12 463/29 |
| 2011/0256915 | A1* | 10/2011 | Sloan | A63F 13/12 463/9 |
| 2011/0275431 | A1* | 11/2011 | Hirzel | A63F 13/10 463/23 |
| 2011/0306427 | A1* | 12/2011 | Pawson | A63F 13/005 463/42 |
| 2012/0231888 | A1* | 9/2012 | Abe | H04L 67/38 463/42 |
| 2013/0005473 | A1* | 1/2013 | Bethke | A63F 13/10 463/42 |

FOREIGN PATENT DOCUMENTS

| KR | 10-2005-0091594 A | 9/2005 |
|---|---|---|
| KR | 10-2005-0096366 A | 10/2005 |

OTHER PUBLICATIONS https://www.youtube.com/watch?v=2Ar8mcUNI9E, YouTube, "Quick Hits Commentary with Ben and Zac of BSCRNetwork" by One Orgasm At a Time . . . , dated Jan. 18, 2011.*

* cited by examiner

Figure 8

| Team information | |
|---|---|
| Character name | Skill/capability points |
| Special character | ???/??? |
| Character 2 | 163/190 |
| Character 3 | 186/200 |
| Character 4 | 279/300 |
| Character 5 | 371/380 |
| ⋮ | ⋮ |
| Character 18 | 173/200 |
| Character 19 | 135/160 |
| Character 20 | 268/280 |

CN — Character name column
CP — Skill/capability points column

Figure 9

| Character information | | | |
|---|---|---|---|
| CN — Character name | | | |
| CI — Character image | Common | 98/100 | SK1 |
| | Attack | 97/100 | SK2 |
| | Pass | 98/100 | SK3 |
| | Defense | 99/100 | SK4 |
| | Goalkeeping | 100/100 | SK5 |
| TSP — Total skill points | 492/500 | | |
| ST — Experience points | 0 | | |
| CP — Capability points | 492 | | |

METHOD AND DEVICE FOR PROVIDING CHARACTER OF ONLINE GAME

CROSS REFERENCE TO RELATED APPLICATIONS

This application is a 35 U.S.C. §371 National Phase Entry Application from PCT/KR2012/009920, filed Nov. 22, 2012, and designating the United States, which claims priority under 35 U.S.C. §119 to Korean Patent Application No. 10-2011-0132304 filed Dec. 9, 2011, which are incorporated herein in their entireties.

TECHNICAL FIELD

The present invention relates to a skill for acquiring a special character having a capability point that is different from a generally acquirable character, differentiating some of special characters by regions, providing the same, and increasing interest of users for the game in a character managing online game.

BACKGROUND ART

On-line gaming is a field that is becoming more popular in an on-line cultural industry in recent years because of the development of networks and computer technology. Users have required various kinds of online games as the online games have developed, and very various categories of online games are currently serviced. Most online games presently serviced provide characters. The users use their terminals to access a game server, select a character provided by an online game, and control the character to enjoy the game. In the online game, there are characters that are provided without cost, and there are characters that the user must buy by using game points. When the user possesses a plurality of characters, he may alternately change a plurality of characters and may play a game. Among the online games providing a character, there is a game for the user to possess a team including a plurality of characters, individually scout, hire, or contract a plurality of respective characters configuring the team, and manage the team. The character usable in the game may be provided without a limit of period to the user, and depending on the kind of game, the character usage period may be restricted, a character usage fee may be paid again through a renewal when the usage period has expired, and the usage period of the corresponding character may be extended. One of such character providing games may provide special characters with capability points that are different from other characters so as to add users' interest to the game. The special character may be set to have capability points that are greater than those of a general character or have a special skill that is not assigned to other characters. Depending on the games, a characteristic of the special character may be realized not by a difference of capability points or skills but by a simple difference of character shapes. In the special character providing game, a method for a user to acquire a special character must be provided in a serious manner. When it is very easy for the user to acquire the special character, the number of users possessing the special character are increased. A scarcity value of the special character is then worsened and the users lose interest in the special character. On the contrary, when it is very difficult for the user to acquire the special character, most users except some users may abandon attempts at acquisition of the special character. Therefore, in consideration of an appropriate level for the user to feel interested, the game provider needs to allow the user to acquire the special character. The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for acquiring a special character, rather than a conventionally acquirable character in a game, increasing a scarcity value of the special character by adjusting a probability to acquire the special character, and increasing users' interest in the game by providing a special character that is different according to a region.

Technical Solution

An exemplary embodiment of the present invention provides a method for providing a character of an online game, including: by a character providing device, receiving a using signal on a special character item that is one of items owned by a user from a user terminal; when receiving the using signal, setting at least one special character that is a character generated according to a predetermined standard and at least one other character excluding the special character as characters that may be won; setting a probability for the user to acquire one of the at least one special character; casting lots according to the predetermined probability, and determining one character, from among one of the at least one special character that is set to be a character that may be won and the at least one other character, as a won character; and registering the won character to a database of characters owned by the user. The setting of characters that may be won includes selecting a predetermined number of characters from among the at least one other character, and setting the same as the characters that may be won. The setting of the same as the characters that may be won includes casting the lots when a number of the characters that are selectively input is equal to the predetermined number. The special character is a regional special character that is differently set according to a region of the user terminal accessing the online game. The special character is a regional special character that is differently set according to a region for the online game to provide a service. A hiding capability point which is added to a capability point of a character that can be checked by the user terminal and which is a capability point excluded from a capability point number value displayed to the user terminal is set to the special character. Regarding the special character, an upper limit of a character level that is increased according to growth of the character is set to be higher than that of the other character. Another embodiment of the present invention provides a device for providing a character of an online game, including: an information storage unit for storing character information on at least one special character that is a character generated according to a predetermined standard and at least one character excluding the special character, storing a winning probability on the at least one special character, selecting one character from among the at least one special character and one character from among a plurality of characters as a won character according to a using signal on the special character item received from a user terminal, and registering the won character to a database of characters owned by the user; an item information storage unit for storing information on a plurality of items including the special character item, allowing the information storage unit to have one character won according to the special character item using signal, and registering the special character item information to a database of items owned by the user when receiving a buying signal on the special character item; and a cyber money manager for subtracting the special character item cost from cyber money included in the user information when receiving the buying signal on the special character item from the user terminal. The information storage unit sets the at least one special character and a predetermined number of characters from among the at least one character as characters that can be won according to a result of using the special character item, and selects one of the set special character and the character as a won character by lot. The information storage unit selects one special character from among the at least one special character, displays the at least one character to the user terminal, sets the at least one special character and a predetermined number of characters from among the at least one character as characters that may be won according to a result of using the special character item according to a character selecting signal received from the user terminal, and selects one of the set special character and the character as a character won by lot. The information storage unit includes: a character information storage unit including the at least one special character and a plurality of pieces of general character information, and registering the won character to a database of characters owned by the user; and a special character probability adjuster for storing acquisition probability for the at least one special character, and selecting one of the at least one special character and the plurality of general characters by lot according to the stored acquisition probability. The character information storage unit stores a regional special character that is differently set according to a region accessed by the user terminal as the special character. The character information storage unit stores a regional special character that is differently set according to a region in which a game service of the online game is provided as the special character.

Advantageous Effects

According to the embodiment of the present invention, the special character with capability points cannot be generally acquired in the game, the special character can be acquired by the user according to a predetermined probability to increase the scarcity value of the special character, and interests of other users to the user who owns the special character are increased to increase the users' positive image of the game and also increase the interest on the game. Further, the special characters that are different depending on the game access regions are provided to generate the users' interests.

DESCRIPTION OF THE DRAWINGS

FIG. 8 shows a character selecting screen for drawing a special character according to an exemplary embodiment of the present invention.

FIG. 9 shows a detailed information screen of a character according to an exemplary embodiment of the present invention.

MODE FOR INVENTION

Figure 1:
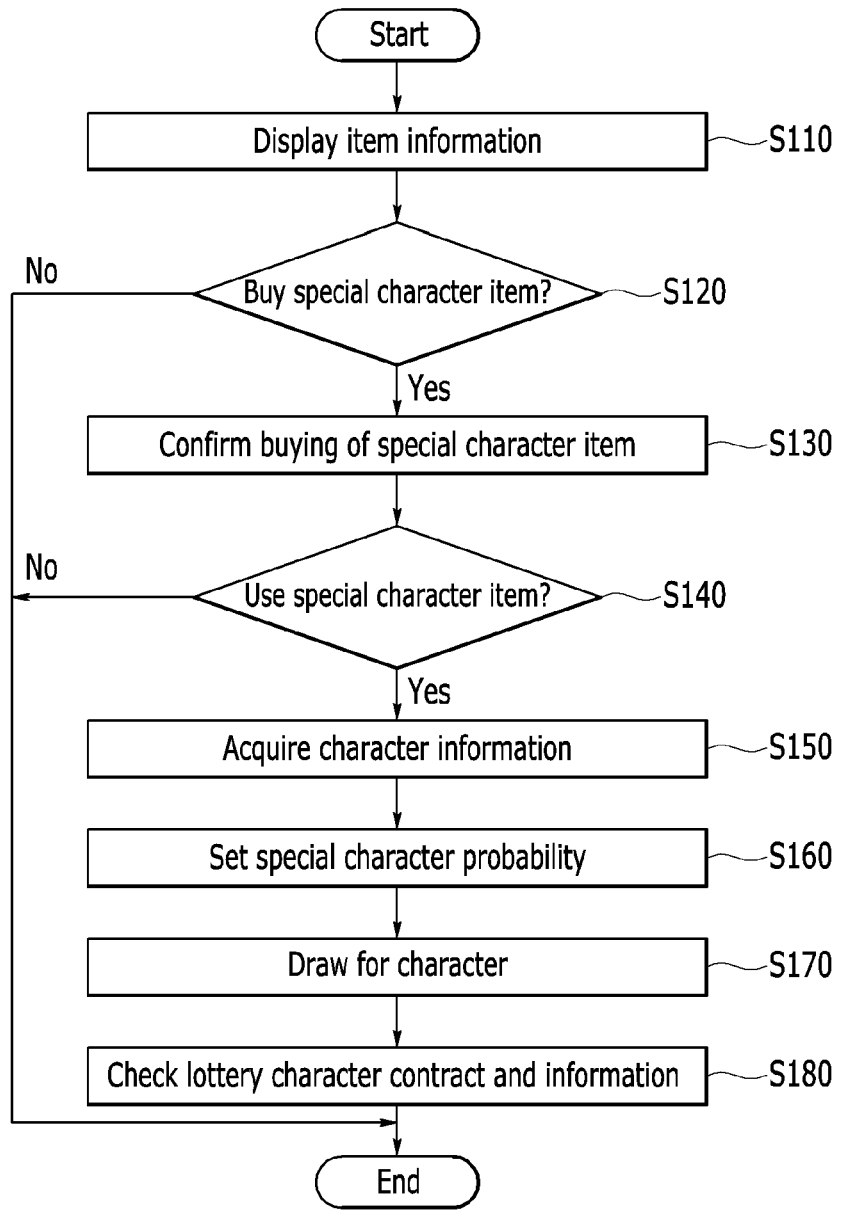
FIG. 1 shows a flowchart of a method for providing a character of an online game according to an exemplary embodiment of the present invention.

An exemplary embodiment of the present invention provides a method for providing a character of an online game, including: by a character providing device, receiving a using signal on a special character item that is one of items owned by a user from a user terminal; when receiving the using signal, setting at least one special character that is a character generated according to a predetermined standard and at least one other character excluding the special character as characters that may be won; setting a probability for the user to acquire one of the at least one special character; casting lots according to the predetermined probability, and determining one character, from among one of the at least one special character that is set to be a character that may be won and the at least one other character, as a won character; and registering the won character to a database of characters owned by the user. The setting of characters that may be won includes selecting a predetermined number of characters from among the at least one other character, and setting the same as the characters that may be won. The setting of the same as the characters that may be won includes casting the lots when a number of the characters that are selectively input is equal to the predetermined number. The special character is a regional special character that is differently set according to a region of the user terminal accessing the online game. The special character is a regional special character that is differently set according to a region for the online game to provide a service. A hiding capability point which is added to a capability point of a character that can be checked by the user terminal and which is a capability point excluded from a capability point number value displayed to the user terminal is set to the special character. Regarding the special character, an upper limit of a character level that is increased according to growth of the character is set to be higher than that of the other character. Another embodiment of the present invention provides a device for providing a character of an online game, including: an information storage unit for storing character information on at least one special character that is a character generated according to a predetermined standard and at least one character excluding the special character, storing a winning probability on the at least one special character, selecting one character from among the at least one special character and one character from among a plurality of characters as a won character according to a using signal on the special character item received from a user terminal, and registering the won character to a database of characters owned by the user; an item information storage unit for storing information on a plurality of items including the special character item, allowing the information storage unit to have one character won according to the special character item using signal, and registering the special character item information to a database of items owned by the user when receiving a buying signal on the special character item; and a cyber money manager for subtracting the special character item cost from cyber money included in the user information when receiving the buying signal on the special character item from the user terminal. The information storage unit sets the at least one special character and a predetermined number of characters from among the at least one character as characters that can be won according to a result of using the special character item, and selects one of the set special character and the character as a won character by lot. The information storage unit selects one special character from among the at least one special character, displays the at least one character to the user terminal, sets the at least one special character and a predetermined number of characters from among the at least one character as characters that may be won according to a result of using the special character item according to a character selecting signal received from the user terminal, and selects one of the set special character and the character as a character won by lot. The information storage unit includes: a character information storage unit including the at least one special character and a plurality of pieces of general character information, and registering the won character to a database of characters owned by the user; and a special character probability adjuster for storing acquisition probability for the at least one special character, and selecting one of the at least one special character and the plurality of general characters by lot according to the stored acquisition probability. The character information storage unit stores a regional special character that is differently set according to a region accessed by the user terminal as the special character. The character information storage unit stores a regional special character that is differently set according to a region in which a game service of the online game is provided as the special character.

DETAILED DESCRIPTION OF THE EMBODIMENTS

Hereinafter, a method and device for providing a character of an online game according to exemplary embodiments of the present invention will be described with reference to accompanying drawings.

It is obvious that the following exemplary embodiment is a detailed description which is provided for better understanding of the present invention but does not limit the scope of the present invention. Therefore, an equivalent invention which performs the same function as the present invention may also be covered by the scope of the present invention.

In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), and (b) may be used. These terms are used only to differentiate the components from other components, but the nature, sequence, order, etc. of the corresponding components are not limited by these terms. When a component is "connected", "coupled", or "linked" to another component, it is to be noted that the component may be directly connected or linked to the another component, but the component may be "connected", "coupled", or "linked" to the another component via another component therebetween.

In an exemplary embodiment of the present invention, "communication", "communication network", and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer that users access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middleware for database or servers which perform payment processing may be connected to the game server, but the description thereof will be omitted in the present invention.

In the present invention, characters indicate all characters which appear in the game through which users experience one of sports among on-line games. The character appears on a game screen and shows a predetermined action in accordance with the manipulation of the user. Further, the character increases a level by accumulating predetermined experience points in accordance with a result of playing the game, and when the level is increased, capability points of the character become stronger.

In the present invention, each capability point represents a sum of skill points that may be or are assigned to respective characters. That is, each capability point indicates a sum of experience points that may be changed into skill points and a sum of skill points currently owned by the character. Each character obtains an experience value as a result of performing a game, and the experience value is assigned as an experience point in the game. The user changes the assigned experience point into various kinds of skill points that may be set by the character to increase the capability of the character and let it have a characteristic desired by the user. For example, the character level is increased as a result of performing the game, and each character acquires an additional experience point at each level increase. The user may change the acquired experience point into a skill point. Therefore, the capability point is a sum of experience points that are not yet changed into skill points and the sum of skill points that are changed into skill points for each skill.

The skill of the character may be set in various ways according to the characteristic of each game, and for example, when the online game is an online fantasy game, it may be set as magic, attack, and defense as sorts of skills owned by the character. Further, when the online game is an online soccer game, a common skill, attack, pass/dribble, defense, and goalkeeping for indicating skills of a player corresponding to the character may be set as the sorts of skills of the character. Each skill may be further subdivided and provided according to game settings. For example, detailed skills such as power and accuracy may be provided for the attack from among the skills of the online fantasy game, and detailed skills such as endurance, physical strength, and composure may be provided for a common skill in the online soccer game. The user changes the capability points to each skill with different ratios so that the same characters provided to the users with the same characteristics may grow to be characters with different characteristics according to a change form of the respective users' capability point into the skill point. That is, when the user receives the same character and plays a game, he changes the capability point into various kinds of skill points and uses the same to allow different respective characters' characteristics, thereby growing the characters having different characteristics.

In the present invention, sports signify sports of general meanings, and mean all kinds of sports that may be performed as online games. For example, soccer, baseball, basketball, tennis, volleyball, track and field, and martial arts may be included.

In the present invention, the character usage fee and cost does not mean the amount of commodity money but the cyber money or game points with which the user may buy a character or an item in the online game. The user may acquire the cyber money and the game points when he plays the game, and depending on the cases, he may acquire cyber money or game points by selling the item acquired while playing the game to a shop in the game. Further, depending on the game, he may pay commodity money and acquire cyber money. The amount of commodity money may individually match the amount of cyber money, and in general, they are set in a different manner. Depending on the game, the cyber money may be changed to the game points of the online game. That is, the cyber money and the game points may be exchanged mutually or in a single direction.

FIG. 1 shows a flowchart of a method for providing a character of an online game according to an exemplary embodiment of the present invention.

Referring to FIG. 1, regarding the method for providing a character of an online game according to an exemplary embodiment of the present invention, a character providing device acquires item information and displays the same to a user terminal (S110). Generally, the online game includes multiple types of items. Kinds and functions of the items that may be provided in the game may be set in various ways according to the game types. The items may be acquired for nothing while playing the game or may be bought by payment of game points or cyber money. The items that must be bought by paying game points or cyber money may be generally bought at the item shop provided in the game. Item information may include information such as an item name, and an item function and price, and may include information on restrictions when there is a limit on purchase or usage. For example, when a specific item includes a restriction condition on a level of the character, the user must recognize information on the corresponding restriction condition before buying an item. Therefore, item information must include a restriction condition.

Figure 2:
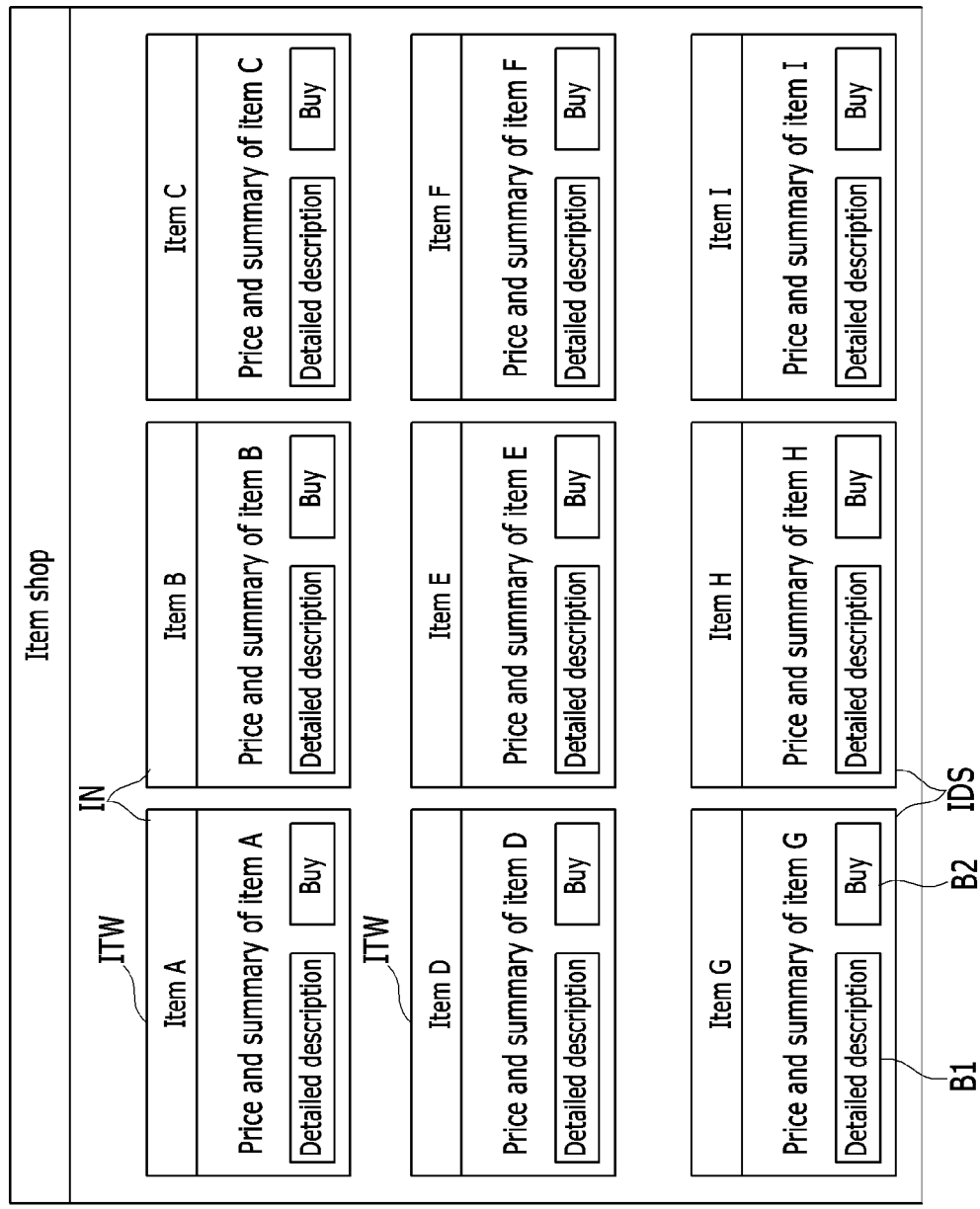
FIG. 2 shows an item shop screen according to an exemplary embodiment of the present invention.

FIG. 2 shows an item shop screen according to an exemplary embodiment of the present invention.

As shown in FIG. 2, the item shop includes a plurality of item information windows (ITW) that may be bought by the user and displays a plurality of items. The plurality of item information windows (ITW) display an item name (IN) unit for displaying an item name and an item description (IDS) unit for displaying an item summary. The item description unit may display contents selected as the most important information from the corresponding item. For example, a price of the item and a function of the item may be displayed. Further, a buyable condition and a usable condition on the item may be displayed on the item description (IDS) unit.

Also, a detailed description button B1 for the user to view a detailed description screen for displaying a detailed description of the corresponding item and a buy button B2 for having him to buy the corresponding item are displayed on each item information window (ITW). A detailed description screen on the item will be described later.

It has been shown in FIG. 2 that a plurality of items are displayed on one screen, and when there are a huge number of items, screen scrolling or a plurality of screens may be used. When a plurality of items are divided and displayed on a plurality of screens, a plurality of items may be classified by types and item screens for the respective types may be provided.

In the present invention, the item the user may buy has nothing to do with the level of the present user, owned cyber money, or owned game points. That is, when the present user's level, owned cyber money, and owned game points fail to reach a condition for buying a specific item, it signifies all items which he may buy according to a subsequent increase of level, an increase of owned game points, and a purchase of cyber money. For example, when the user's presently owned game points are 1500 points and a price of a specific item is 2000 points, the user may not immediately buy the item requiring 2000 points as a price, but he can buy it when he additionally acquires the points, so the item with the price of 2000 points is also included in the item the user may buy.

However, since an item not acquirable by a purchase but by progress of the game cannot be acquired from the item shop shown in FIG. 2, it is not an item that the user can buy.

All the items the user owns including the items bought from the item shop or the item acquired through progress of the game may be checked from a user owned item list. After the owned item list is checked, the owned items can be used at a time desired by the user.

Here, the user may be considered as equal to team information when the user manages the team, and game points and items match the team information and are stored in it.

Referring to FIG. 1, when the item information is displayed, the user may select one of a plurality of items displayed to the user terminal and may buy the same, and the character providing device receives an item buying signal from the user terminal and determines whether the item the user desires to buy is a special character item (S120).

When it is not the case of buying a special character item according to a determination result, the user may buy another item or it may be determined that he does not buy the item. However, the case of buying another item except the special character item or buying no item is not included in the scope of the present invention, so no detailed description thereof will be provided.

When the item buying signal received by the character providing device is a special character item buying signal, the character providing device displays a detailed screen for displaying a usage limit condition or a usage method of the special character item, and confirms buying of the special character item (S130). The buying confirmed special character item matches character information so that it may be included in the character's owned item list.

It is determined whether the user uses the special character item (S140). The case in which the user does not use the special character item is not included in the scope of the present invention, so no detailed description thereof will be provided. When the user desires to use the special character item, he acquires character information for using the special character item (S150). The character information acquired here is information including at least one special character, and may also include a general character rather than a special character.

When the character information for the special character item is acquired, a probability for acquiring the special character item when the special character item is used is set. As described above, the special character is a character having a different capability point or skill from the general character. For example, the online soccer game generates a character for the player who is active offline, and the special character may be generated for players who retired and are legends of the past. Further, a player who is representative of each region of the user's game server access region may be selected as a target of the special character.

When an acquisition possibility for the special character is great, it does not generate a difference from the general character so the user does not feel interested in the special character. That is, his interest in the game is reduced. Therefore, the game service provider sets the acquisition probability of the special character in advance to maintain a value of the special character (S160). In addition, when there are multiple special characters, it may be possible to apply different acquisition probabilities to the special characters.

When the probability on the special character is set, the character is drawn according to usage of the special character item (S170). A lottery of the character represents a process for acquiring the special character according to a predetermined probability, and the character may be drawn by using various probability functions. In general, a lottery of the special character is divided into acquisition or acquisition failure of the special character. In the case of the acquisition failure on the special character, most games indicate acquisition failure and do not supply any reward character or item.

However, when the special character item is not provided for nothing during the play of a game but it is bought by paying cyber money by the user and no reward item is provided, this is contrary to the fair game culture. That is, it is natural to supply an item or a character with an appropriate level for the game item paid by the user as a reward for the cost paid by the user, and it is desirable to provide the special character that is an additional factor for increasing interest of the game as a service. In this instance, when the special character item bought by the user is an item that may be bought with game points acquirable for nothing while playing a game, it may be considered to be a complimentary item, so it is fine to provide no reward item.

Hence, in the present invention, a general character for the case in which the user fails to acquire the special character when using the special character item is also provided. Regarding the general character provided at this time, a character that fails to reach the special character but that is difficult to acquire from among the general characters may be provided. Depending on the case, the user may directly select characters to be acquired as a reward when failing to acquire the special character.

When one of the characters corresponding to the acquired character information is selected through lottery, the user contracts with the won character and checks information on the won character (S180). In this instance, the contract with the won character may be performed by matching user information and won character information. Also, since the contract does not use a conventional character contract method and the character is supplied as a reward for using the special character item, the user cannot select contract progress regarding the contract with a won character. That is, the won character is automatically contracted with the user.

Figure 3:
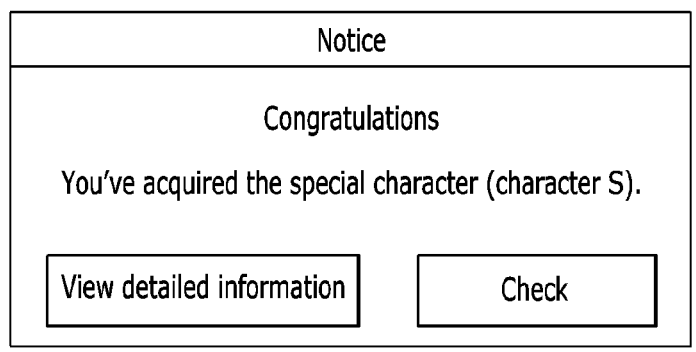
FIG. 3 shows a screen on which a special character according to an exemplary embodiment of the present invention is won as a won character.

FIG. 3 shows a screen on which a special character according to an exemplary embodiment of the present invention is won as a won character.

In the case in which the character selected through the lottery in S170 for drawing a character of FIG. 1 is a special character, S180 for checking a won character contract and information includes displaying contents on the won character to the user as shown in FIG. 3. Particularly, when the won character is a special character, it is explicitly displayed that the special character is won as shown in FIG. 3. When detailed information viewing is selected, a detailed description on the special character is displayed. When a general character is won, it may be displayed in a like manner of FIG. 3. However, when the special character is selected, a brief characteristic of the special character may be displayed on the won screen of FIG. 3.

Regarding the characteristic of the special character, a simple difference of appearances compared to the general character, a difference of capability points, and both of them may be provided together. However, the simple difference of appearances is mainly used for the case of complimentary provision, and the special item provided by the item bought by the user generally provides a capability point that is different from the general character. In the present invention, as an example for the characteristic of the special character, hiding capability points may be provided, and a method for increasing a maximum level and displaying a special character may be provided. The hiding capability point is a method for providing an additional hidden capability point to the capability point displayed as owned by the special character so that the user may experience specificity on the special character when the user plays a game. The maximum level increase is a method for setting a level threshold of the special character to be greater than a level that is above a level threshold of the general character. Most games providing a concept of levels prevent acquisitions of a level that is greater than a predetermined degree in order to adjust a balance of the entire game. That is, there is a threshold level, and the level of the character cannot rise beyond the threshold level. However, the special character may be allowed to have a level that is greater than the threshold level of the general character in order to increase the value of the special character. Special character displaying is used to display an icon for indicating that the corresponding character is a special character on a character name or a character image, or near the character name or the character image on the various screens while the game is performed, so that other users may be interested in the special character. Further, when the special character is generated for real persons from the past in a like manner of the above-noted online soccer game, a history on the real persons for the special character or history information is provided together to increase the value of the special character.

Figure 4:
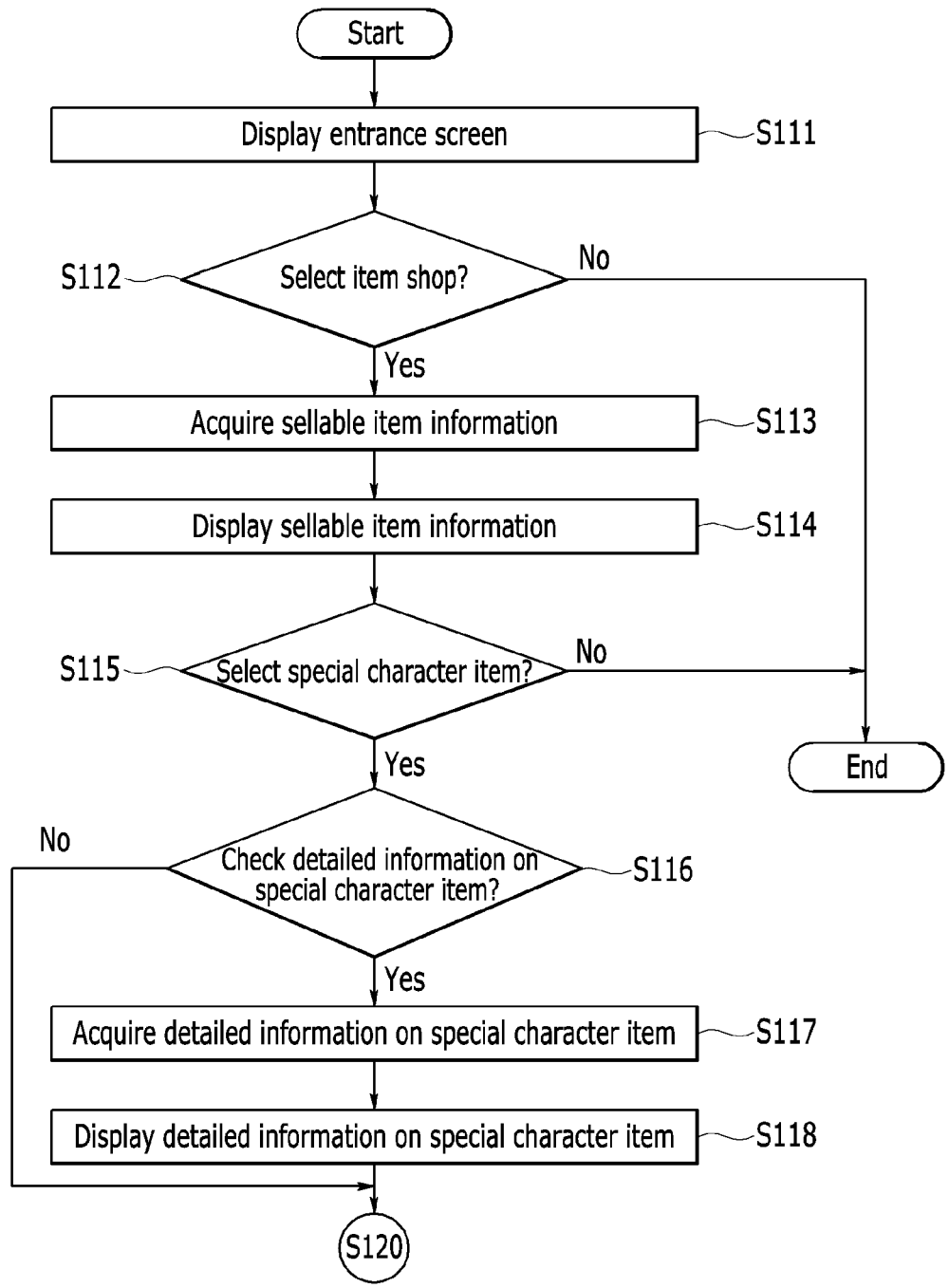
FIG. 4 shows a flowchart for displaying item information according to an exemplary embodiment of the present invention.

FIG. 4 shows a flowchart displaying item information according to an exemplary embodiment of the present invention.

As shown in FIG. 1, S110 for displaying item information includes allowing a character providing device to acquire item information and display the same to the user terminal. Referring to FIG. 4, when the user accesses a game server, the game server displays an entrance screen (S111). The entrance screen is a screen for setting a game condition when the user accesses the game server. The entrance screen may not only set the game condition to be progressed by the user, but may also display currently owned character information, a level, and a mission to be progressed. The entrance screen may also provide an item shop icon. The item shop provides item information so that the user may buy an item, and also supports a settlement process.

When the entrance screen is displayed, it is determined whether the user has selected an item shop (S112). When the item shop is selected, the character providing device acquires sellable item information (S113). It then displays the acquired sellable item information (S114). The sellable item is described, and sellable item information displayed is shown in FIG. 2 so no detailed description will be provided.

When an item choice signal is applied from among the displayed items, the character providing device checks whether the item choice signal is a special character item choice signal (S115). When the item shop is not selected or the item choice signal is not the special character item choice signal, this case is not included in the scope of the present invention, and descriptions will be omitted.

However, when the item choice signal is a special character item choice signal, a selection displaying on the special character item is performed, and it is determined whether the user tries to check detailed information of the special character item (S116).

When he tries to check the special character item detailed information, the character providing device acquires detailed information on the special character item (S117). It then displays detailed information on the special character item to the user terminal (S118).

Figure 5:
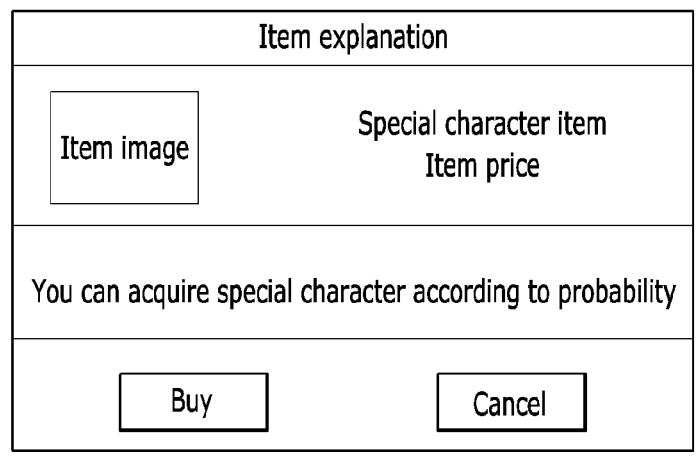
FIG. 5 shows a detailed information screen of a special character item according to an exemplary embodiment of the present invention.

FIG. 5 shows a detailed information screen of a special character item according to an exemplary embodiment of the present invention.

As shown in FIG. 5, a special character item detailed information screen displays an item image, a price of the special character item, and detailed contents on the special character item, and it provides a buy or cancel button. It is explicitly described in the detailed contents on the special character item that the special character item may be acquired according to the probability. This is to prevent the user from equating or confusing special character item buying and special character buying, and thereby prevent the user's mistake. Additionally, characteristics of the described special character may be described on the special character item detailed information screen. For example, the user may be induced to feel interested in the special character by describing the characteristics such as hiding capability points and level threshold up.

Figure 6:
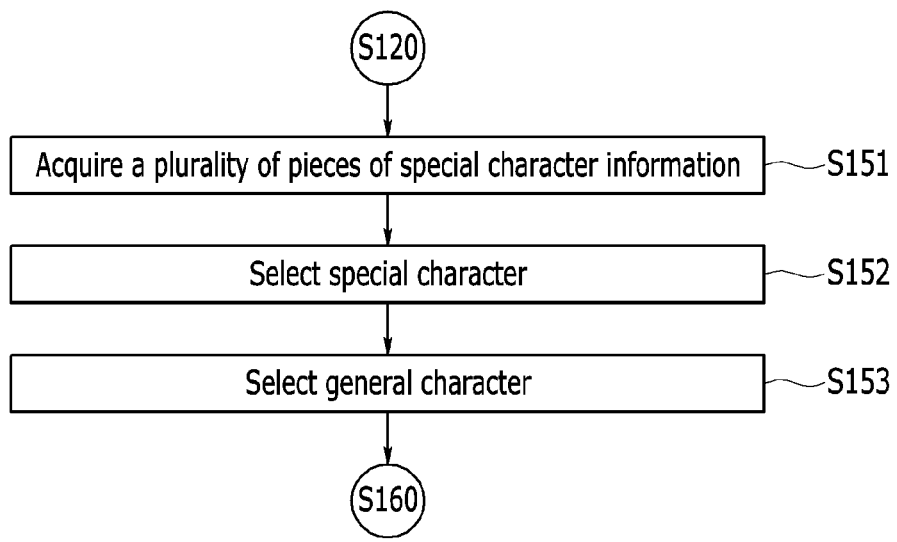
FIG. 6 shows a character information acquisition flowchart according to an exemplary embodiment of the present invention.

FIG. 6 shows a character information acquisition flowchart according to an exemplary embodiment of the present invention.

In FIG. 1, acquisition of character information may include acquiring information on the special character, and may include acquiring the same inclusive of information on the general character. Further, the special character may be provided as a single character, and a plurality of special characters may be provided. Special characters that are different for respective access regions may be provided from among a plurality of special characters. In the game, the general character or the special character is generated according to a progress scenario of the game. Therefore, when a scenario of the game is based on a myth or a fantasy novel, the character appearing in the original myth or the fantasy novel is generated as a general character or a special character. In the online sports game, general characters or special characters are generated for past and present famous players of respective sports. However, the scenario of the game may have nothing to do with a regional characteristic of the user accessing the game. For example, games based on Greek mythology or medieval Europe have nothing to do with Korea's regional characteristics so there are no characters that are familiar with regions in Korea, and most kinds of games that are based on the online soccer do not provide characters on the players of countries that do not have famous soccer leagues and worldwide famous players. Therefore, in the present invention, special characters that are appropriate for respective regional characteristics may be generated and provided. For example, in a Greek mythology based game, Dankoon who is a character of a Korean traditional myth may be provided as a special character. Further, the online soccer games serviced for Thailand may provide soccer players who are famous in Thailand as special characters. When the special characters satisfying the regional characteristics are provided, the user has characters suitable for his regional feature and he may feel further interested in the game.

When the character providing device can provide a plurality of special characters in FIG. 6, it acquires a plurality of pieces of special character information (S151). It selects at least one special character from among the acquired special character information (S152). While the character providing device can provide a plurality of special characters, it may not provide a plurality of special characters. The character providing device may select at least one special character from among a plurality of special characters and provide the same. When at least one special character is selected and provided from among a plurality of special characters, the user may try to acquire another special character after acquiring one special character, thereby increasing the interest in the game. Further, since the acquisition probability for at least one special character may be differently set, the users feel some of the special characters as further special characters.

When one of a plurality of special characters can be acquired, the acquisition probability of the general character may be determined to be a residual probability minus the sum of probabilities of the respective special characters that may be won in the entire probability of 100%.

When the special character is selected, the character providing device may select a general character (S153). Since the special character is acquirable by the probability, the character providing device may provide a general character to users who used the special character item but failed to acquire a special character. In this case, the character providing device may directly select the general character and provide it, and depending on the case, the user may directly select from a plurality of general characters.

Figure 7:
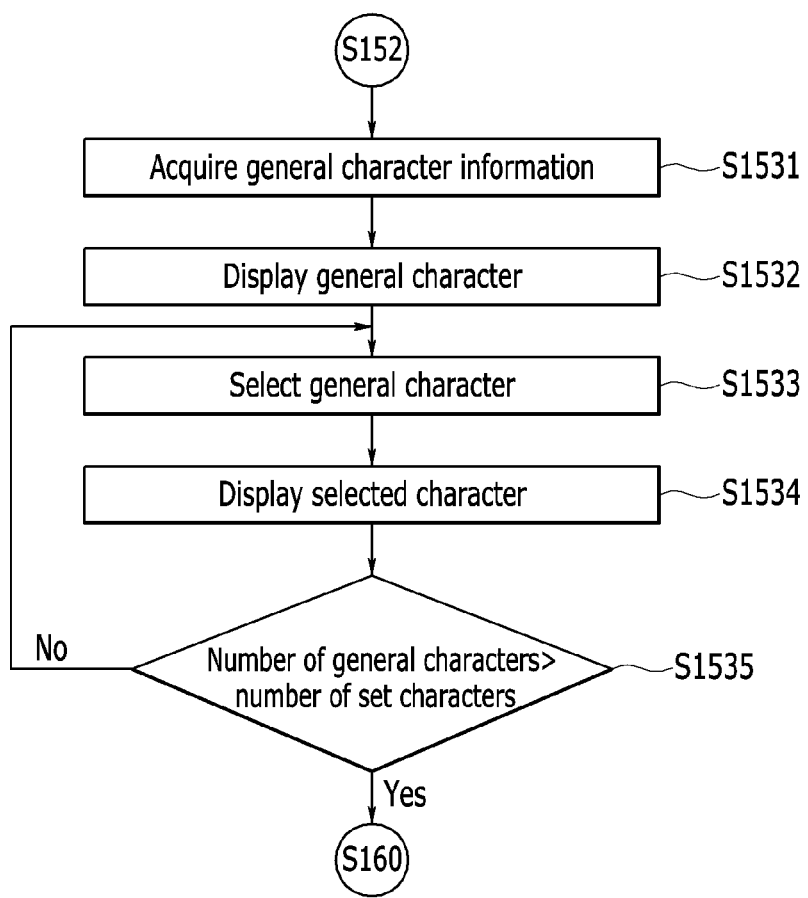
FIG. 7 shows a flowchart for selecting a general character according to an exemplary embodiment of the present invention.

FIG. 7 shows a flowchart for selecting a general character according to an exemplary embodiment of the present invention.

Referring to FIG. 7, the character providing device acquires general character information (S1531). It displays the acquired general character information to the user terminal (S1532). The user selects one character from among the general characters and transmits a general character selecting signal to the character providing device (S1533). The character providing device receives the character selecting signal and displays that the character is selected (S1534). It determines whether a number of the selected general characters is greater than a predetermined number of characters (S1535). In a like manner that the special character is selected by lottery according to the probability, when the special character item is used, the general character may also be selected by lottery according to the residual probability minus the probability for acquiring the special character. The number of general characters that are lottery targets is desirably within a predetermined number of characters than the number of whole characters provided by the game. Therefore, when the number of selected general characters is not greater than the predetermined number of characters, another general character may be selected (S1533). However, when the number of selected general characters is greater than the predetermined number of characters, drawing of a character in FIG. 1 is performed (S170). Before the drawing of a character (S170), a stage for the character providing device to check whether the general character selected by the user corresponds to the character that is selected for lottery may be further included.

FIG. 8 shows a character selecting screen for drawing a special character according to an exemplary embodiment of the present invention.

In FIG. 8, the special character is displayed at an uppermost end from among the characters that are lottery targets, and the skill points or the capability points of the special character are indicated with question marks so that the user may not know in advance which special character he will acquire when he acquires a special character. This is, when a plurality of special characters are provided, to increase curiosity on the special character, the user is prohibited from determining in advance whether to use the special character item according to an acquirable special character.

Other characters 2 to 20 are general characters, which the character providing device may directly select and provide or the user may select. The general character, differing from the special character, displays information on each character in advance so that the user may acquire information on the acquirable general characters. The number of general characters may be adjusted in various ways depending on the game.

FIG. 9 shows a detailed information screen of a character according to an exemplary embodiment of the present invention.

The detailed information screen on the character shown in FIG. 9 may be used to select and display character information of FIG. 8. Also, the detailed information screen of the character of FIG. 9 may be displayed when character information is checked during a game or a character contract is to be performed. The user may check information on the characters owned by him or the characters he desires to own by selecting a character information button on the game access screen or while playing a game.

In FIG. 9, the character information screen displays a character name (CN), a character image (CI), skill points (SP1-SP5) for respective skills, a total skill point (TSP), an experience point (ST), and a capability point (CP). The character name (CN) is a title assigned to each character, it is designated in the game, and depending on the case, the user may directly designate it.

The character image (CI) shows a shape of the character displayed in the game, and it is generated as a previously designated image in the game. However, in some recent games, the user may directly realize the image of the character with various combinations, and when the player of the online sports game is used as a character, the players of the corresponding actual sports game may be realized as images.

The skill points (SP1-SP5) for respective skills numerically show current skill points on the maximum point (hereinafter, level skill point) that may be set in the current level for each skill. Respective skill types may be adjusted in various ways according to the setting of the game as described above, and in the present invention, skills of the online soccer game are shown as an example of the online game. The skill points by types shown in FIG. 9 are provided as five skill types including a common skill, attack, pass, defense, and goalkeeping, and they indicate capabilities of the players by skills who correspond to the character in the online soccer game.

Regarding the skill points by types on the character with reference to FIG. 9, the current character shows the skill point of 98 for the common skill, the skill point of 97 for the attack, the skill point of 98 for the pass, the skill point of 99 for the defense, and the skill point of 100 for the goalkeeping. Therefore, the character displayed in FIG. 9 is a character of which most of the skills nearly reach the limit in the current level.

Regarding the level skill point of the current character, all level skill points are set to be 100. In the present invention, the limit of the level skill point is assumed to be 100.

In further detail of the level skill point, as described above, the skill point represents the capability point of the character in the game, and basically, the more skill points the character has, the better the game performance capability it has. However, when the skill point of the character used by the user for playing a game becomes greater than the level of the game the user has to currently play, capability of the character is greater than the level of difficulty of the game and he may somewhat lose interest in the game. Therefore, in a great number of the online games, the character level increasing in a stepwise manner according to the level of difficulty of the game to be performed is set and a level skill point corresponding to each level is set. When the level of the character is determined, the level skill point corresponding to the level of the character is automatically set, and the user is restricted so that he must not increase the skill point over a predetermined level skill point before the level of the character is increased. That is, the level skill point represents a threshold for increasing the skill point of the character corresponding to the level of the character. In this instance, the level skill point may not be set to be a point value in proportion to the level of the character, but may be differently set in consideration of the characteristic of the character. That is, the character with an attack disposition may be set to have a relatively high level skill point for the attack and pass skills as shown in FIG. 9, and the character with a defense disposition may be set to have a relatively high level skill point for the defense and goalkeeping. The character of FIG. 9 is a character with the maximum level whose entire levels are set to be 100 points that is the threshold level.

The total skill point (TSP) represents a sum of skill points for respective types. In FIG. 9, the total skill point which is the sum of skill points for respective types is given as 98+97+98+99+100=492 by summing the common skill point 98, the attack skill point 97, the pass/dribble skill point 98, the defense skill point 99, and the goalkeeping skill point 100. In a like manner, the total level skill point which is the sum of level skill points for respective types is calculated as 100*5=500. That is, the total level skill point is a maximum skill point reachable on the current level of the character. Therefore, since the total skill point of the character is 492 in the character information shown in FIG. 9 and the level skill point is 500, the displayed character has a margin of increasing the skill point by 500−492=8 points from the current level.

The experience point (ST) is indicated as 0. As described above, the experience point is a point that the user may change into a skill point, and it may be changed into a skill point for each type. When the experience point is changed to the skill point for each type, its ratio is generally 1:1. The experience point is denoted as 0 in FIG. 9, and assuming that the experience point is 10, when the experience point 2 is changed into the attack skill point, the attack skill point is increased by 1 and becomes 100 while the experience point is reduced by 2 and becomes 8. However, since the level skill points for respective types of the respective character are set, he cannot change the owned experience point to the attack skill point. In FIG. 9, the attack level skill point is set to be 100 and the current attack skill point is set to be 98 so the maximum limit for changing the experience point into the attack skill point is 100-98=2.

Although not shown, + and − buttons may be added to one side of the skill points for respective types to increase or reduce the skill point. For example, when he clicks the + button provided to one side of the defense skill point, the defense skill point is increased and the experience point (ST) is reduced in proportion to the increase. On the contrary, when he clicks the − button, the defense skill point is reduced and the experience point (ST) is increased. In this instance, the skill point that is reduced when he clicks the − button cannot be lower than a predetermined skill point (i.e., previously determined skill point) when the character information screen is initially displayed. That is, the − button cannot reduce the skill points for respective types on the current character information screen with a point value that is greater than the point value that is increased when he clicks the + button. This is to make the user focus on growth of the character and prevent the game balance from being broken by allowing a very high degree of freedom of the user.

Although not shown, regarding the skill points for respective types, when he selects the corresponding skill, skills for respective detailed types may be extended and skill points for respective detailed types may be set.

The skill points and the experience points may be set to be real number values, and most games set the point with positive integers so that the users may check the points intuitively. For better comprehension and ease of description, the points will be assumed to be set with positive integers in an exemplary embodiment of the present invention.

The capability point is calculated as the sum of the total skill point and the experience point of the character, and the capability point is 492+0=492 in FIG. 9. When the character of FIG. 9 owns the experience point 10, it must be calculated as 492+10=502, which, however, exceeds the limit of the skill points the character may own, so it is desirable to set the capability point to not exceed the sum of the maximum level skill point. That is, when the character of FIG. 9 has the experience point that is greater than 8, the capability point (CP) must be set to not exceed 500.

The user may select the character acquirable when the special character is not selected by referring to the character selecting screen and the character's detailed information screen of FIG. 8 and FIG. 9.

It has been described that the special character is acquirable only when the special character item is bought, and in the game in which the special character is acquirable without buying the special character item, the stages prior to S140 for using a special character item of FIG. 1 may be omitted. Further, when the special character item is used and the special character item is not won, the stage for selecting a general character for a lottery may be omitted in the game that is set to not supply a general character as a reward item.

Figure 10:
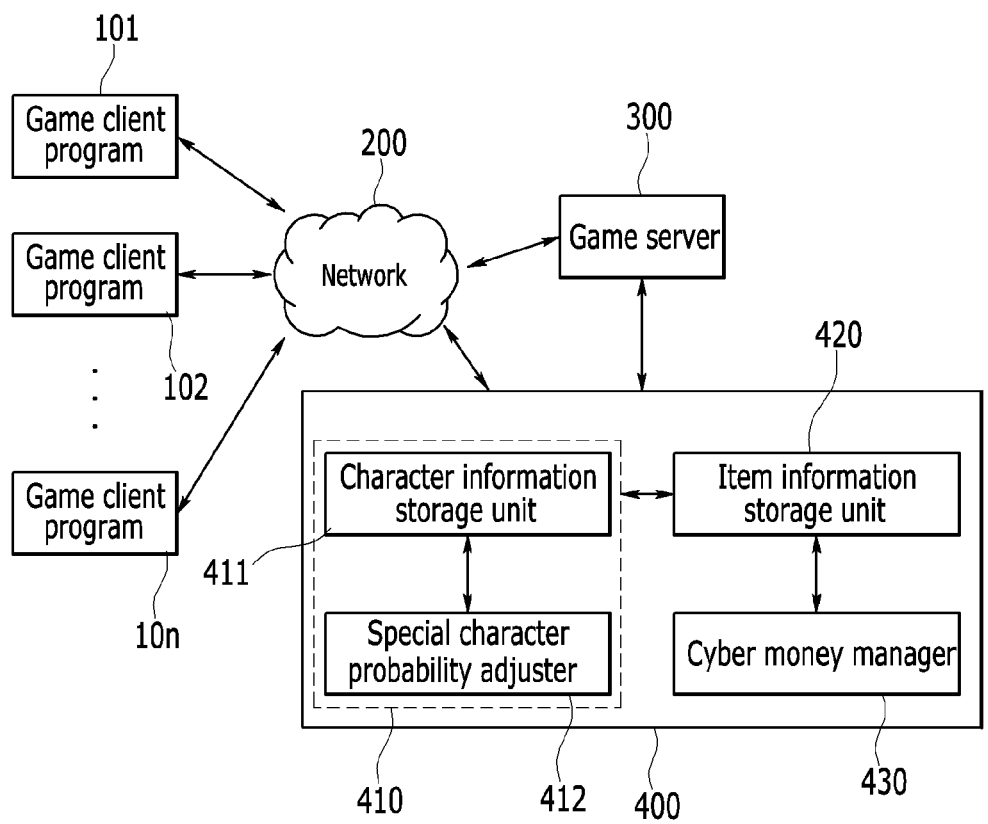
FIG. 10 shows a block diagram of a character providing device of an online game according to an exemplary embodiment of the present invention.

FIG. 10 shows a block diagram of a character providing device of an online game according to an exemplary embodiment of the present invention.

As shown in FIG. 10, a special character providing system of an online game according to an exemplary embodiment of the present invention includes a plurality of user terminals (101-10$n$), an Internet 200, a game server 300, and a character providing device 400. The plurality of user terminals (101-10$n$) respectively access the game server 300 through the Internet 200, and a game client for performing a game is installed.

The game server 300 provides a web page for the user to access, and provides various services such as chatting, communities, and shopping malls in addition to various Internet games to a plurality of accessed user terminals (101-10$n$). It is shown in FIG. 10 that a plurality of users access the game server 300 through computers (101-10$n$) which may be other terminals for access to the game server 300 through the Internet 200 and play a game. For example, mobile communication terminals or Internet-accessible televisions are usable.

Also, in the present invention, the game server 300 provides a game entrance screen for the user to select a game condition.

When the user enters the game through the web page, the game server 300 drives a game client installed in the user terminal (101-10$n$), and the user terminals (101-10$n$) access the game server 300 through the Internet 200 by the driven game client. Here, it is assumed that the game client is installed in advance in the user terminals (101-10$n$), and if not, the game server 300 determines this state and controls to install a game client for the corresponding game at a proper time.

Further, the game server 300 may include a game database (not shown) for storing game logics for controlling the game. Here, the game logics represent designated rules for automatically performing the game according to a predetermined rule in the game, and they signify displaying a series of progress processes of the game.

The character providing device 400 includes an information storage unit 410 for storing character information and capability information, an item information storage unit 420 for storing various kinds of item information including a special character item, and a cyber money manager 430 for managing the user's cyber money or game points. The information storage unit 410 includes a character information storage unit 411 for storing information on at least one special character and a plurality of respective general characters, and a special character probability adjuster 412 for adjusting an acquisition probability on the special character from among the characters stored in the character information storage unit. The special character probability adjuster 412 may store various probability functions so that the acquirable probabilities on a plurality of special characters may be differently adjusted and the special character may be won according to the probability.

The character information storage unit 411 may provide a per-region special character that may be provided to the corresponding region depending on the user's game access region. As described above, regarding the per-region special character, the character that may be representative of each region even if having nothing to do with the game scenario may be provided as the per-region special character. The per-region special character is a character representing the region so it is undesirable to provide the same to other regions, and the character information storage unit 411 may accordingly analyze the user's access region. Further, when the game server 300 is provided to each region in a classified manner, it may provide a region special character according to the predetermined region in order for the game server to provide a service.

Upon receiving an item shop entrance signal, the character providing device 400 acquires a plurality of pieces of item information from the item information storage unit 420 and displays the same, as shown in FIG. 2. Upon receiving an item choice signal from the user terminal, the item information storage unit 420 transmits detailed information on the selected item to the user terminal. Upon receiving a special character item buying signal from the user terminal, the item information storage unit matches special character item information, user information, and character information, and the cyber money manager subtracts cyber money from user information and character information by the cost of the special character item. When the special character item is purchasable with game points, the game points are subtracted.

Upon receiving a special character item using signal from the user terminal, the special character probability adjuster 412 selects one special character from among at least one special character stored in the character storage unit, and adjusts a winning probability on the selected special character. The character information storage unit 411 selects one special character from among at least one special character and a predetermined number of general characters, and transmits them to the special character probability adjuster 412.

The special character probability adjuster 412 performs a lottery operation according to the probability designated to the special character and the general character transmitted by the character information storage unit 411, and transmits information on the won character to the character information storage unit 411. The character information storage unit 411 matches information on the won character and user information, and performs a character contract so that the user may own the won character. The character information storage unit 411 transmits a character contract completing signal to the item information storage unit 420 to notify that the special character item is used. The item information storage unit 420 cancels the matching of the user information and the special character item to remove the special character item from the user's owned item.

The above-noted information storage unit 410 and the item information storage unit 420 may store character information and item information, respectively, and depending on the case, they may have the game server and information in a separated manner. For example, the item information storage unit 420 may store all information on all the items that may be provided in the game, and in the present invention, the character providing device 400 describes the item for providing the special character so the item information storage unit 420 may store information on the special character item.

The character providing device 400 has been shown to be an additional device in FIG. 10, but it may be included in the game server, and it may also be realized as a database depending on the cases.

The method and device for providing a character of an online game according to an exemplary embodiment of the present invention may be executed by an application (which may include a platform basically mounted in the terminal or a program included in the operating system) installed in the terminal, and it may be executed by an application (i.e., program) directly installed in the terminal by the user through an application providing server such as an application store server or a web server relating to an application or a corresponding service. In this respect, the method for providing a character of an online game according to the above-described exemplary embodiment of the present invention may be implemented by the applications (i.e., programs) which are basically installed or directly installed by the user in the terminal, and may be recorded in a computer readable recording medium of the terminal and the like.

The programs are recorded in the computer readable recording medium and are executed by the computer, such that the above-mentioned functions may be executed.

As described above, in order to execute the method for providing a character of an online game according to an exemplary embodiment of the present invention, the above-mentioned programs may include codes which are coded with computer languages such as C, C++, JAVA, machine language, and the like which may be read by a processor (CPU) of the computer.

The code may include a function code associated with a function for defining the above-mentioned functions, and may also include an execution procedure related control code required for the processor of the computer to execute the above-mentioned functions according to a predetermined procedure.

Further, the code may include a memory reference related code indicating at which location (address number) of the memory inside or outside the computer additional information or media required for the processor of the computer to execute the above-mentioned functions needs to be referenced.

In addition, in order for the processor of the computer to execute the above-mentioned functions, when the processor needs to communicate with any other computers or servers, etc., at a remote location, the code may further include a communication related code regarding how the processor of the computer communicates with any other computers or servers at a remote location or which information or media the processor of the computer transmits and receives at the time of the communication, by using the communication module (for example, wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with the programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus store and execute a computer readable code by a distributed manner. In this case, at least one computer among a plurality of distributed computers may execute a part of the above-mentioned functions and transmit the executed results to at least one of the other distributed computers, and the computer receiving the result may also execute a part of the above-mentioned functions and provide the executed results to the other distributed computers.

Particularly, the computer readable medium having recorded the application which is a program for executing the method for providing a character of an online game according to the respective exemplary embodiments of the present invention may be a storage medium (e.g., hard disk drive) included in the application store server or the application provider server such as a web server relating to an application or a corresponding service, or the application provider server itself.

A computer, which may read a recording medium recorded with applications that are programs for executing the method for providing a character of an online game in accordance with the exemplary embodiments of the present invention, may include not only a general PC such as a typical desktop and a laptop, but also a mobile terminal such as a smart phone, a tablet PC, a personal digital assistant (PDA, and a mobile communication terminal, and is to be construed as all the computable devices.

Further, when the computer for reading the recordable medium having recorded the application which is a program for executing the method for providing a character of an online game according to the exemplary embodiment of the present invention is a mobile terminal such as a smartphone, a tablet PC, a personal digital assistant (PDA), or a mobile communication terminal, the application may be downloaded to a general PC from the application provider server and may be installed in the mobile terminal through a synchronization program.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more components without departing from the scope of the present invention. In addition, although each of all the components may be implemented by one independent piece of hardware, some or all of the respective components which are selectively combined with each other may be implemented by a computer program having a program module performing some or all of functions combined with each other in one or multiple pieces of hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components but further include the components. In addition, unless defined otherwise in the detailed description, all the terms including technical and scientific terms have the same meaning as those generally understood by those skilled in the art to which the present invention pertains. Generally used terms such as those defined in a dictionary should be interpreted as having the same meanings as those within a context of the related art and should not be interpreted as ideally or excessively formal meanings unless clearly defined in the present specification.

The spirit of the present invention has been exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims, and it should be interpreted that all spirits equivalent to the following claims fall within the scope of the present invention.

The invention claimed is:

1. A method for providing a character of an online game, comprising:
    receiving, by a character providing device, a using signal from a user terminal on a special character item owned by a user;
    in response to receiving the using signal, setting, by the character providing device, at least two characters that may be won, wherein the two characters that may be won comprise at least one general character and at least one special character generated according to a predetermined standard;
    setting, by the character providing device, a predetermined probability for the user to acquire one of the at least one special character;
    holding a drawing, by the character providing device, according to the predetermined probability for determining a won character,
    determining, by the character providing device, one character, in response to a result of the drawing, from among the at least two characters that may be won, as the won character; and
    registering the won character to a database of characters owned by the user,
    wherein the at least one special character is a regional special character that is differently set according to at least one of a region of the user terminal accessing the online game and a region for the online game to provide a service.

2. The method of claim 1, further comprising selecting, by the character providing device, a predetermined number of general characters as a number of the at least one general character that may be won.

3. The method of claim 2, further comprising:
    transmitting, by the character providing device, the at least one general character to the user terminal,
    receiving, by the character providing device, a selection input on one of the at least one general character from the user terminal, and,
    setting, by the character providing device, a character that corresponds to the selection input as one of the at least one general character that may be won.

4. The method of claim 3, further comprising:
    holding the drawing, by the character providing device, when a number of general characters selectively input by the user is equal to the predetermined number.

5. The method of claim 1, wherein an upper limit of a character level is set to be higher for the at least one special character than that of the at least one general character, wherein the character level is increased according to a growth of a character.

6. A device for providing a character of an online game, comprising
    a character information storage unit, the character information storage unit comprising
        information on at least one special character that is a character generated according to a predetermined standard and at least one general character, the general character excluding the special character, and a predetermined acquisition probability on the at least one special character; and, a processing unit, the processing unit configured for:

receiving a using signal on a special character item from a user terminal, selecting, according to the predetermined acquisition probability and the using signal, one character from among the at least one special character and the at least one general character as a won character, and, registering the won character to a database of characters owned by the user, wherein the character information storage unit stores a regional special character that is differently set according to a region accessed by the user terminal as the special character.

7. The device of claim 6, wherein the processing unit is further configured for:

setting the at least one special character and a predetermined number of general characters from among the at least one general character as characters that can be won, and selecting one of the at least one special character that is set as a character that may be won and the at least one general character that may be won as a character won by lot.

8. The device of claim 6, wherein the processing unit is further configured for:

selecting one special character from among the at least one special character, displaying the at least one general character to the user terminal, setting the at least one special character and a predetermined number of general characters from among the at least one general character as characters that may be won according to a character selecting signal received from the user terminal, and holding a drawing to select the won character from one of the at least one special character that is set as a character that may be won and the at least one general character.

9. The device of claim 6 further comprising:

a special character probability adjuster for adjusting the predetermined acquisition probability for the at least one special character, wherein the processing unit is further configured for:

selecting one of the at least one special character and the plurality of general characters by lot according to an adjusted acquisition probability.

10. The device of claim 6, wherein the character information storage unit stores a regional special character that is differently set according to a region in which a game service of the online game is provided as the special character.

11. The device of claim 6, further comprising:

an item information storage unit for storing information on a plurality of items, the items including the special character item, and a cyber money manager comprising information on an amount of cyber money owned by the user, wherein the processing unit is further configured for:

receiving a buying signal from the user terminal on the special character item;

registering the special character item information to a database of items owned by the user; and subtracting a cost of the special character item from the amount of cyber money owned by the user.

12. A computer readable medium for recording a program for realizing a method for providing a character of an online game, the method comprising:

by a character providing device, receiving a using signal from a user terminal on a special character item that is one of a plurality of items owned by a user;

in response to receiving the using signal, setting at least two characters that may be won, wherein the two characters comprise at least one special character that is a character generated according to a predetermined standard and at least one general character, the general character excluding the special character;

setting a predetermined probability for the user to acquire one of the at least one special character;

holding a drawing according to the predetermined probability for determining a won character;

determining one character, in response to a result of the drawing, from among the at least two characters that may be won as the won character; and registering the won character to a database of characters owned by the user, wherein the special character is a regional special character that is differently set according to at least one of a region of the user terminal accessing the online game and a region for the online game to provide a service.

* * * * *